(12) United States Patent
Nash et al.

(10) Patent No.: US 8,074,365 B2
(45) Date of Patent: Dec. 13, 2011

(54) LETTUCE HARVESTING FOR CUP-SHAPED PORTIONS OF HEADS

(75) Inventors: Kevin Nash, Salinas, CA (US); Leon Ventura, Watsonville, CA (US); Rafael Garibay, Seaside, CA (US)

(73) Assignee: Dole Fresh Vegetables, Inc., Salinas, CA (US)

( * ) Notice: Subject to any disclaimer, the term of this patent is extended or adjusted under 35 U.S.C. 154(b) by 0 days.

(21) Appl. No.: 12/978,306

(22) Filed: Dec. 23, 2010

(65) Prior Publication Data

US 2011/0088364 A1    Apr. 21, 2011

Related U.S. Application Data

(63) Continuation of application No. 11/376,513, filed on Mar. 14, 2006, now Pat. No. 7,861,415.

(51) Int. Cl.
*B26B 9/00*    (2006.01)
(52) U.S. Cl. .......................... 30/346; 134/198
(58) Field of Classification Search ..................... 53/221, 53/226, 463; 99/473, 467, 537, 544; 134/25.3, 134/32; 30/316, 151, 295, 345, 113.1; 56/327.1
See application file for complete search history.

(56) References Cited

U.S. PATENT DOCUMENTS

| | | | |
|---|---|---|---|
| 1,447,662 A | 3/1923 | Hoffman | |
| 2,222,388 A | 11/1940 | Zimmer | |
| 2,577,407 A | 12/1951 | Dent | |
| 2,659,144 A | 11/1953 | Conkle | |
| 2,684,907 A | 7/1954 | Brunsing | |
| 2,699,048 A | 1/1955 | Brunsing | |
| 2,699,877 A | 1/1955 | Huston | |
| 3,621,672 A | 11/1971 | Meredith | |
| 3,800,518 A * | 4/1974 | Baggiolini et al. | 56/327.1 |
| 3,821,987 A | 7/1974 | Shepardson et al. | |
| 4,094,238 A | 6/1978 | Striplin | |
| 4,176,595 A | 12/1979 | Shaw | |
| 4,900,219 A | 2/1990 | Azzopardi et al. | |
| 5,056,223 A | 10/1991 | Buck et al. | |
| 5,121,589 A | 6/1992 | Ventura et al. | |
| 5,290,580 A | 3/1994 | Floyd et al. | |
| 5,316,778 A | 5/1994 | Hougham | |
| 5,560,190 A | 10/1996 | Ottaway | |
| 5,727,690 A | 3/1998 | Hofmeister | |
| D395,209 S | 6/1998 | Deglon | |
| 5,992,169 A | 11/1999 | Later | |
| 6,036,989 A | 3/2000 | Ellis | |
| 6,622,467 B1 * | 9/2003 | Ottaway | 56/327.1 |
| 6,843,049 B2 | 1/2005 | Brown | |
| 6,883,421 B2 | 4/2005 | Beaumont | |
| 6,996,964 B2 * | 2/2006 | Maconachy et al. | 56/327.1 |
| D546,135 S | 7/2007 | Ricks | |
| 7,395,653 B2 | 7/2008 | de Groot et al. | |
| 2002/0164407 A1 | 11/2002 | Wolfe et al. | |
| 2003/0182808 A1 | 10/2003 | Mireles et al. | |
| 2003/0182920 A1 | 10/2003 | Maconachy et al. | |
| 2004/0149545 A1 | 8/2004 | Tarantino et al. | |

(Continued)

*Primary Examiner* — Arpad Fabian-Kovacs
(74) *Attorney, Agent, or Firm* — Morrison & Foerster LLP

(57) ABSTRACT

Lettuce can be commercially harvested by removing the bottom portion of a head of lettuce to obtain only the top portion of the head. After the top portion of the head is obtained, a center section of the top portion of the head is removed to leave a cup-shaped portion of the head. The bottom portion of the head is removed and the center section of the top portion is removed in the field in which the head is harvested.

35 Claims, 9 Drawing Sheets

U.S. PATENT DOCUMENTS

2004/0187465 A1 9/2004 Tarantino et al.
2004/0187466 A1 9/2004 Garcia et al.
2005/0112256 A1 5/2005 Mitchell et al.
2005/0233039 A1 10/2005 Wolfe et al.
2006/0090780 A1 5/2006 Brown et al.

* cited by examiner

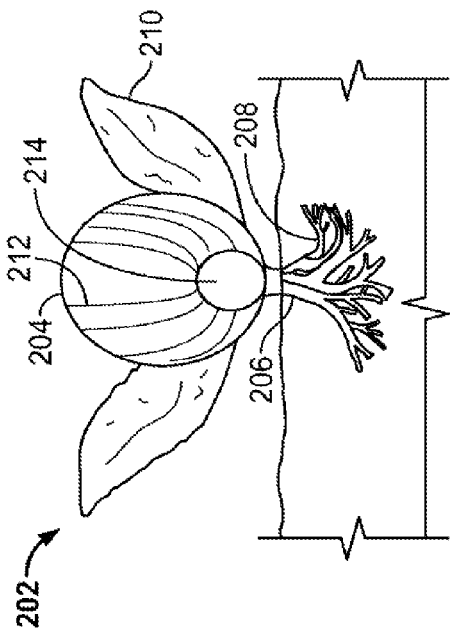
FIG. 2
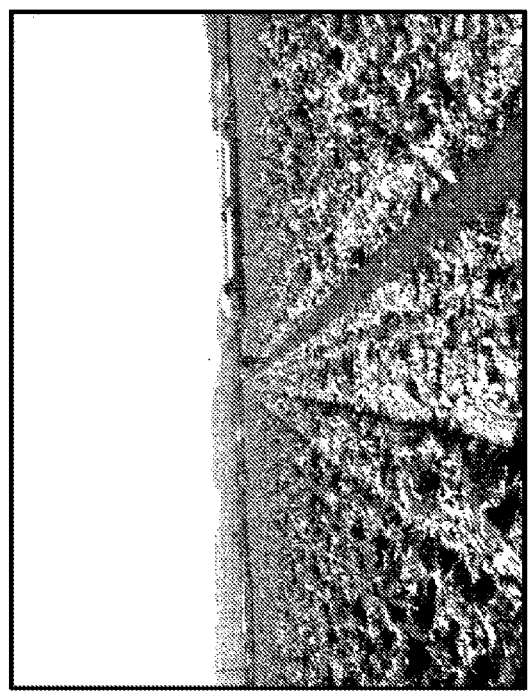
FIG. 1
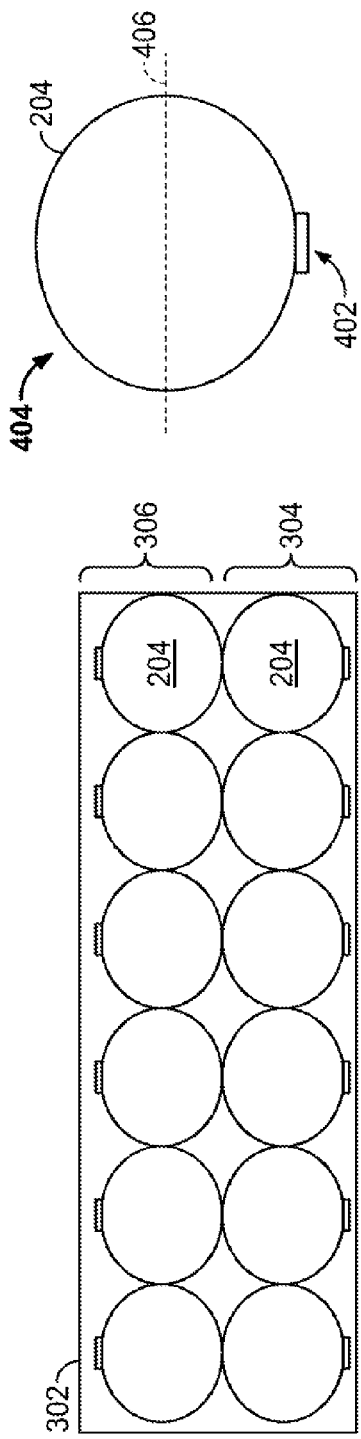
FIG. 4
FIG. 3

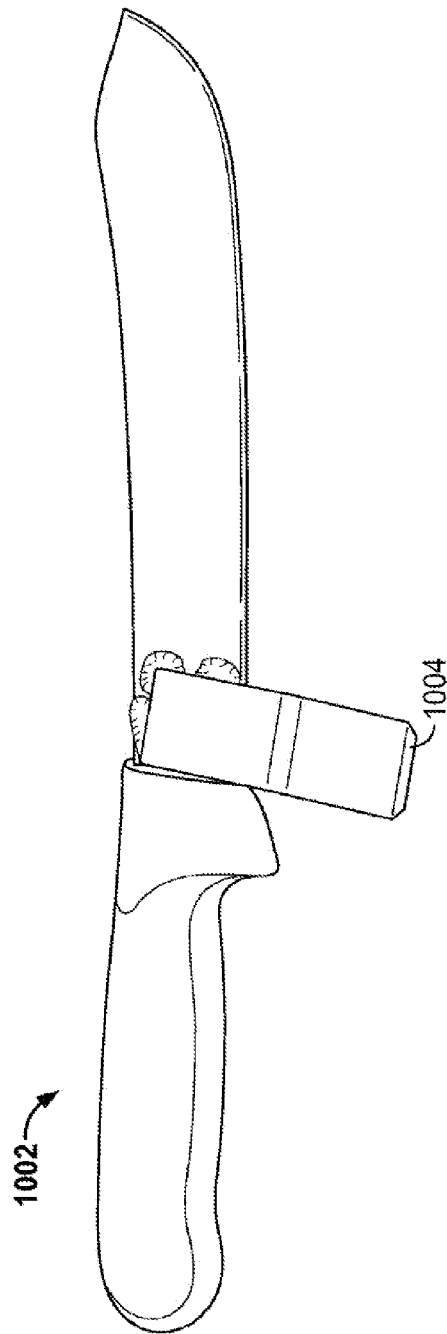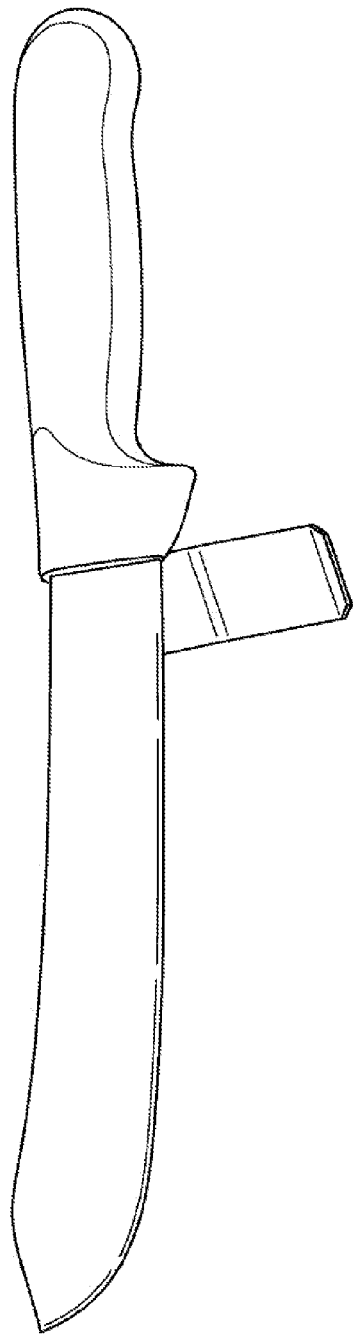
FIG. 10A
FIG. 10B

LETTUCE HARVESTING FOR CUP-SHAPED PORTIONS OF HEADS

CROSS REFERENCE TO RELATED APPLICATION

The present application is a Continuation application of U.S. patent application Ser. No. 11/376,513, filed Mar. 14, 2006, which is incorporated herein by reference in its entirety.

BACKGROUND

1. Field

The present application relates to commercial lettuce harvesting, and, more particularly, to commercial lettuce harvesting for cup-shaped portions of heads.

2. Related Art

The commercial lettuce industry is a multi-billion dollar industry. Lettuce is produced and shipped year round in the U.S. with the source of supplies changing with the seasons, with California and Arizona dominating U.S. production.

Three types of lettuce dominate commercial production: iceberg, leaf lettuce, and romaine lettuce. Of these three types, iceberg lettuce makes up the majority of the commercial lettuce production in the U.S.

Lettuce is commercially planted as seeds or seedlings in rows in a field. Because lettuce heads tend to be somewhat irregular and delicate, commercial harvesting of lettuce is a manual process.

In conventional commercial lettuce harvesting, teams of field workers harvest lettuce in the field by hand. In particular, field workers referred to as cutters manually cut the stems of the lettuce using hand held harvesting knives. Field workers referred to as packers then pack the harvested whole heads into cardboard boxes, which are more commonly referred to as cartons. The cartons of whole heads are then placed on pallets, vacuum cooled, and then shipped to destination markets, where they are ultimately shipped to end users.

Certain end users, such as restaurants, may use only a portion of a whole head. This can result in various types of waste and costs associated with having shipped the whole heads to the end user. For example, there is waste disposal cost to the end user associated with the unused portions of the whole heads. There is the cost associated with shipping the whole heads to the end user, which included the cost of shipping the unused portion of the whole heads. Additionally, the end user incurs labor costs associated with processing of the whole heads. For an end user that uses a large volume of lettuce, such as a restaurant, the amount of waste and costs can be substantial.

SUMMARY

In one exemplary embodiment, lettuce can be commercially harvested by removing the bottom portion of a head of lettuce to obtain only the top portion of the head. After the top portion of the head is obtained, a center section of the top portion of the head is removed to leave a cup-shaped portion of the head. The bottom portion of the head and the center section of the top portion are removed in the field in which the head is harvested.

In one exemplary embodiment, the bottom portion of the head can be removed by cutting the stem of the lettuce to harvest the head from the ground. After the head has been harvested from the ground, the bottom portion of the harvested head can then be cut away to obtain only the top portion of the head. In another exemplary embodiment, the bottom portion of the head can be removed by cutting away the bottom portion of the head while the lettuce is in the ground to leave the bottom portion attached to the stem in the ground to obtain only the top portion of the head.

DESCRIPTION OF DRAWING FIGURES

The present application can be best understood by reference to the following description taken in conjunction with the accompanying drawing figures, in which like parts may be referred to by like numerals:

FIG. 1 depicts rows of mature lettuce ready to be harvested;

FIG. 2 depicts a single lettuce in the ground;

FIG. 3 depicts whole heads of lettuce packed into a carton;

FIG. 4 depicts a head of lettuce;

Figure 8A:
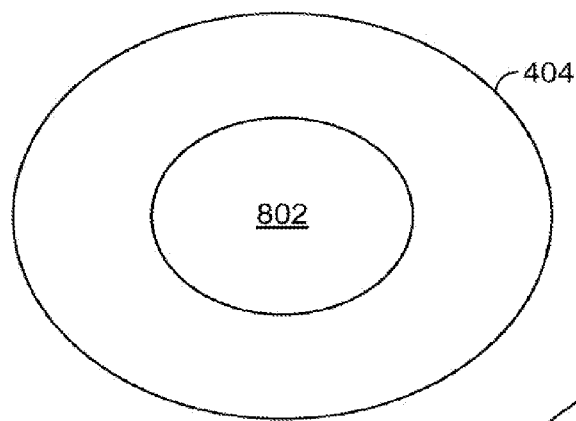
Figure 8B:
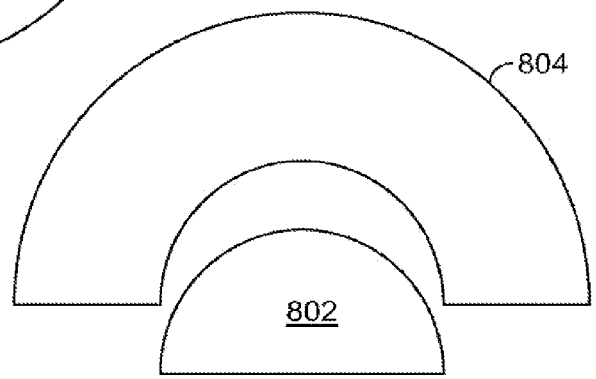
Figure 9:
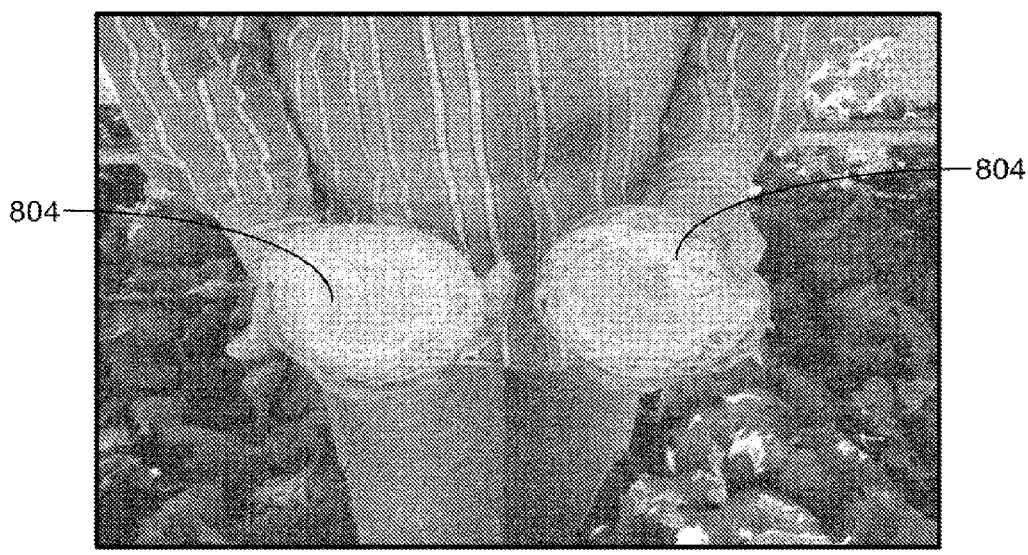
Figure 11B:
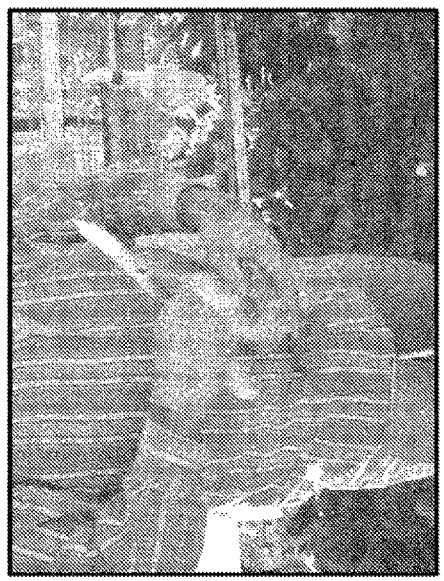
Figure 11D:
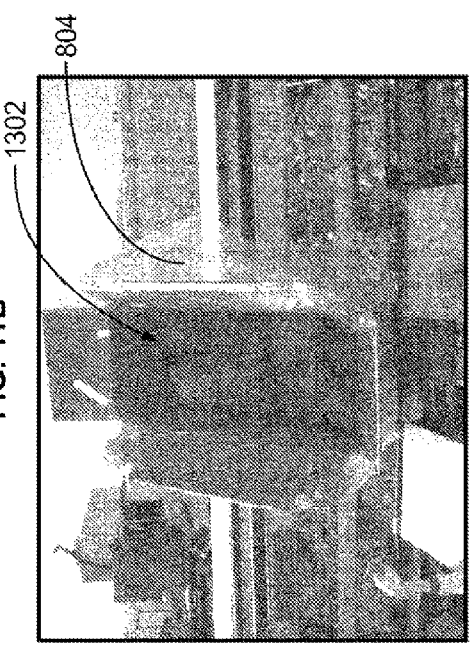
Figure 11A:
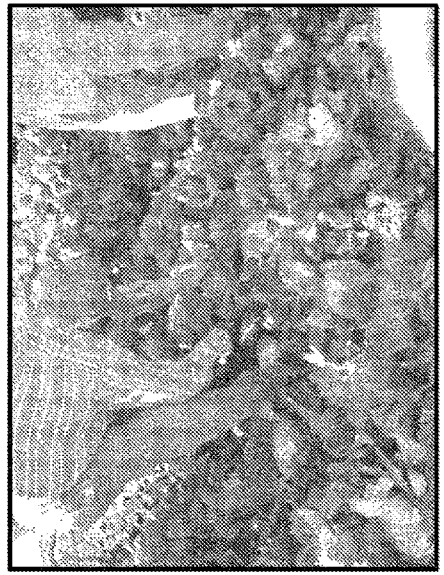
Figure 11C:
Figure 12:
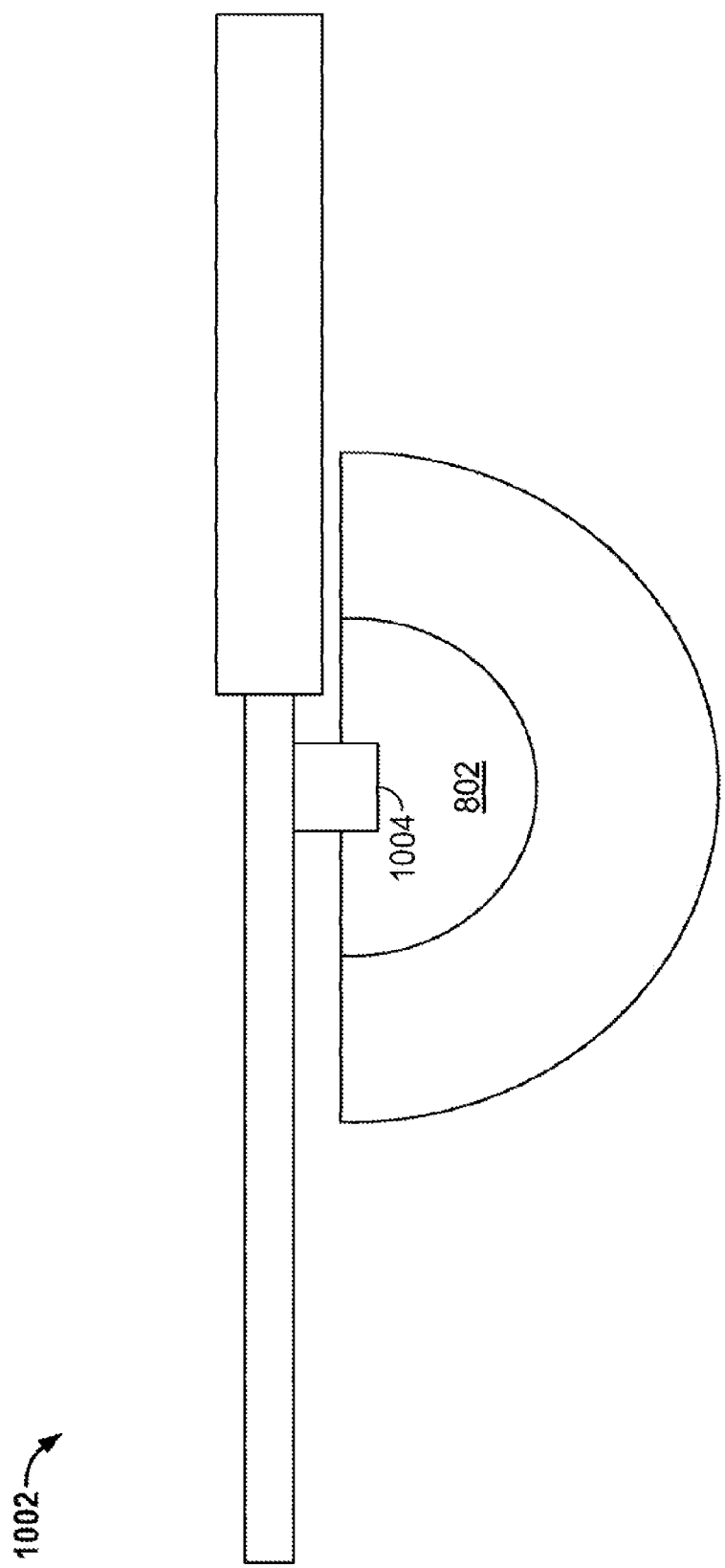
Figure 13:
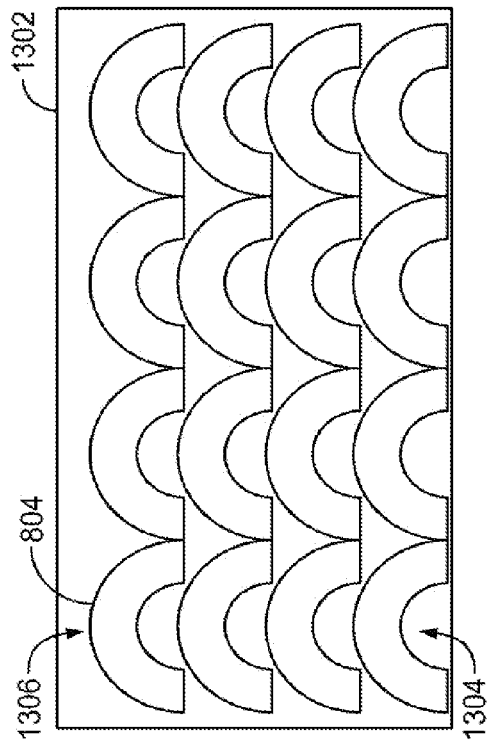
Figure 14:
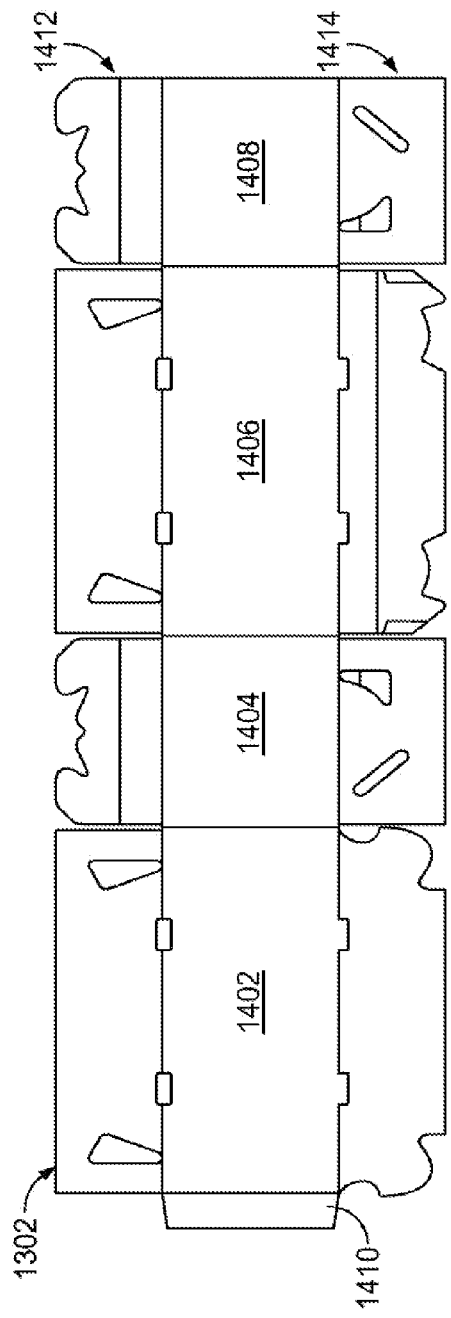
Figure 15:
Figure 17:
Figure 16:
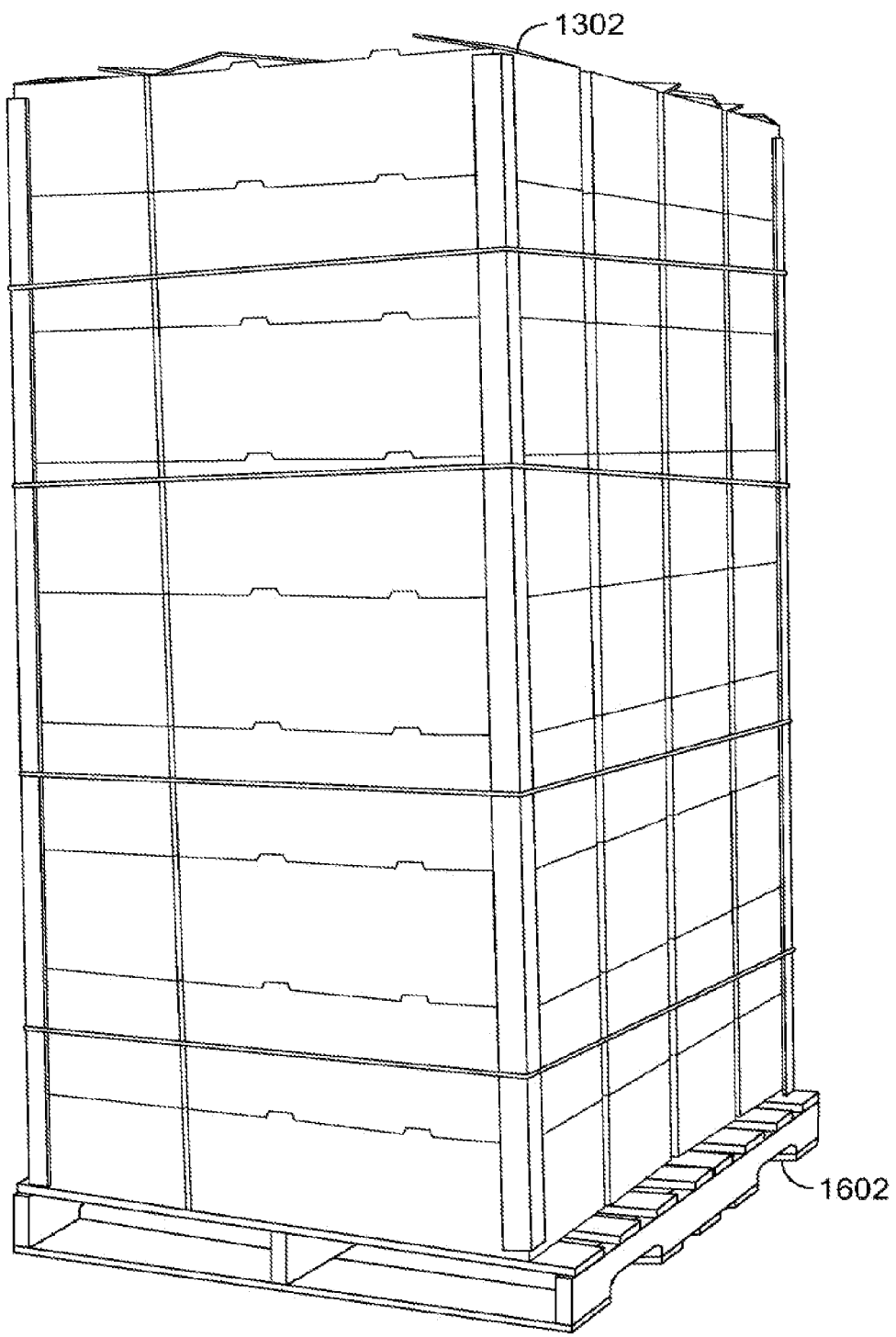

FIG. 8-A depicts a center section within a portion of a cut head of lettuce;

FIG. 8-B depicts the portion of the cut head of lettuce with the center section removed;

FIG. 9 depicts two cup-shaped portions of two top portions of two heads of lettuce;

FIGS. 10-A and 10-B depict a harvesting knife with a cleaning tab;

FIG. 11-A depicts a cutter harvesting a head of lettuce;

FIG. 11-B depicts a cutter removing a center section of a top portion of a head of lettuce;

FIG. 11-C depicts a packer spraying rinsing solution on cut sites on a cup-shaped portion of a head of lettuce;

FIG. 11-D depicts cup-shaped portions of heads of lettuce packed in a carton;

FIG. 12 depicts the harvesting knife of FIGS. 10-A and 10-B being used to remove a center section;

FIG. 13 depicts cup-shaped portions of lettuce heads packed into a carton;

FIG. 14 depicts the dimensions of an exemplary carton;

FIG. 15 depicts a top view of a carton packed with cup-shaped portions of lettuce heads;

FIG. 16 depicts a pallet stacked with cartons of packed cup-shaped portions of lettuce heads; and FIG. 17 depicts an exemplary use of a cup-shaped portion.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

The following description relates primarily to the commercial harvesting of iceberg lettuce, which is also commonly referred to as crisphead or head lettuce. As mentioned above, the market for iceberg lettuce accounts for the majority of the lettuce market in the US. It should be recognized, however, that the following description is also relevant to the harvesting and processing of various types of lettuce and produce.

Iceberg lettuce is commercially planted as seeds or seedlings in rows in a field. Typically, it takes about 65 to 90 days for iceberg lettuce to grow to a size ready to be harvested, approximately 2 pounds in weight. FIG. 1 depicts rows of iceberg lettuce ready for harvesting.

FIG. 2 depicts a single iceberg lettuce 202 in the ground that is ready for harvesting. As depicted in FIG. 2, iceberg lettuce 202 includes a head 204, a stem 206, roots 208, and outer leaves 210. Head 204 includes inner leaves 212 extending from a core 214.

As described above, iceberg lettuce is typically harvested manually. Field workers work in teams to harvest iceberg lettuce in the field. In particular, in a conventional harvesting process, a field worker (referred to as a cutter) cuts some of the outer leaves 210, which are left on the ground. These outer leaves 210 are typically referred to as a blanket. The cutter then uses a harvesting knife to cut the stem. A remnant amount of the stem remains with the harvested head. The harvested head 204 is placed on the blanket to keep it from getting dirty. Heads 204 are typically placed with the portion having the remnant amount of the stem pointing up to reduce the amount of natural juices exuding from the cut site.

Another field worker (referred to as packer) packs the cut heads 204 into a cardboard box, which is more commonly referred to as a carton. With reference to FIG. 3, in a conventional harvesting process, heads 204 are packed in two layers in a single carton 302 (a bottom row 304 and a top row 306). As depicted in FIG. 3, the heads 204 packed in the bottom layer 304 are placed with the stem remnants pointed down toward the bottom of the carton. The heads 204 packed in the top layer 306 are placed with the stem remnants pointed up toward the top of carton 302. Typically, 12 heads 204 are packed into two rows in each layer for a total of 24 heads per carton.

In a conventional harvesting process, 40 cartons 302 are stacked onto a single pallet with eight layers of five cartons 302 in each layer. Each cardboard box 302 typically weighs about 52 pounds. Thus, each pallet typically holds 960 whole heads weighing a total of about 2080 pounds. Cartons 302 on the pallet are vacuum cooled then shipped to destination markets, where they are ultimately shipped to end users.

With reference to FIG. 4, in one exemplary embodiment, lettuce is commercially processed by removing a bottom portion 402 of head 204 to obtain only a top portion 404 of head 204. In one exemplary embodiment, head 204 is cut such that bottom portion 402 has the entire core of head 204. Bottom portion 402 is discarded and top portion 404 is retained. In the present context, the term "portion" is not intended to necessarily refer to halves. Thus, top portion 404 is not necessarily one-half of head 204.

As also depicted in FIG. 4, head 204 has a mid-line 406 defined by the widest portion of head 204 with the stem oriented down. In one exemplary embodiment, head 204 is cut at about mid-line 406 to cut away bottom portion 402 and obtain top portion 404. Note that in this embodiment, bottom portion 402 is about half of head 204. In another exemplary embodiment, head 204 is cut above mid-line 406 to cut away bottom portion 402 to obtain top portion 404. Note that in this embodiment, bottom portion 402 is more than half of head 204. In still another exemplary embodiment, head 204 is cut below mid-line 406 to cut away bottom portion 402 and obtain top portion 404. Note that in this embodiment, bottom portion 402 is less than half of head 204. Top portion 404 that remains after cutting away bottom portion 402 can range between about 30 to 40 percent by weight of head 204.

In one exemplary embodiment, bottom portion 402 is removed and top portion 404 is obtained by first cutting the stem of the lettuce to harvest head 204 from the ground. After head 204 has been harvested from the ground, head 204 is cut longitudinally in the field to cut away bottom portion 402 and obtain only top portion 404 of head 204. In the present context, the phrase "cut longitudinally" means that if head 204 is held with the stem portion pointed directly down, then the cut is made horizontally. It should be recognized, however, that the cut need not be precisely horizontal or even within a few degrees of being horizontal, merely that it is more horizontal than vertical.

It should be recognized that any number of cuts can be made to obtain the desired amount of top portion 404 of head 204. For example, a small portion of bottom portion 402 can be initially cut away. Any number of subsequent cuts can then be made to remove the desired amount of bottom portion 402 and leave the desired amount of top portion 404 of head 204.

In another exemplary embodiment, bottom portion 402 of head 204 is removed by cutting away bottom portion 402 while head 204 is attached to the stem in the ground. The remaining top portion 404 is retained while bottom portion 402 is left in the ground along with the stem and roots.

Figure 5:
FIG. 5 depicts a cutter harvesting a head of lettuce by cutting away a bottom portion of the head.
Figure 6:
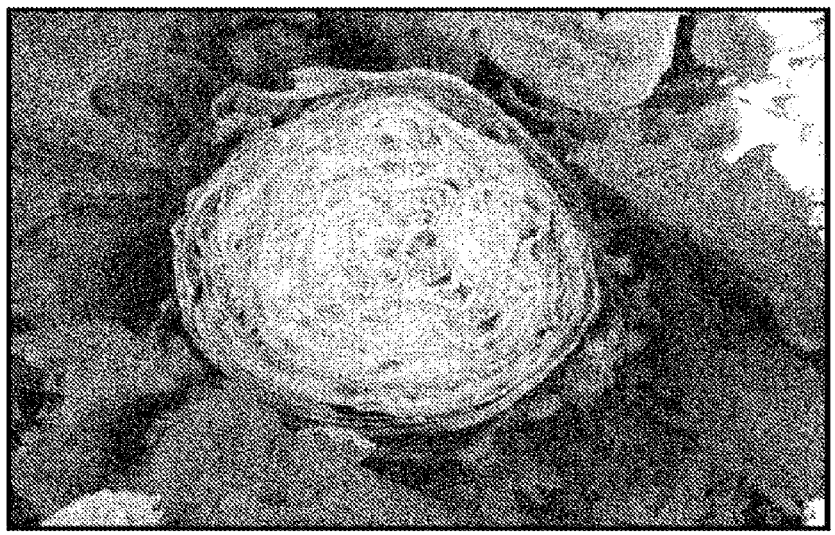
FIG. 6 depicts the bottom portion of a head of lettuce left attached to the stem in the ground.
Figure 7:
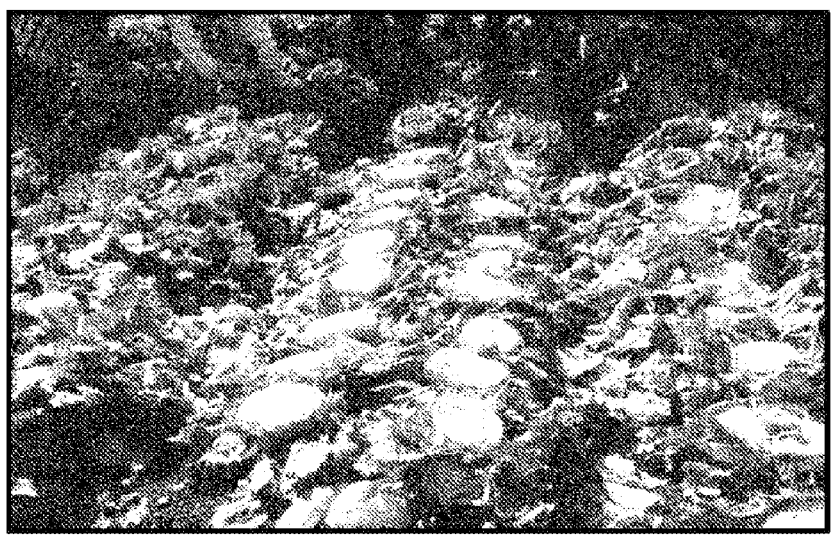
FIG. 7 depicts bottom portions of heads of lettuce left attached to stems in the ground.

In particular, with reference to FIG. 5, a field worker is depicted cutting the bottom portion of a head while the head is attached to the stem in the ground. FIG. 6 depicts the bottom portion of the head left in the ground. The top portion of the head is retained. FIG. 7 depicts rows of bottom portions of heads left in the ground after harvesting.

It should be recognized that any number of cuts can be made to obtain the desired amount of the top portion of the head. For example, a small portion of the bottom portion can be initially cut while the head is attached to the stem in the ground. Any number of subsequent cuts can then be made to remove the desired amount of the bottom portion and leave the desired amount of the top portion of the head.

With reference to FIG. 8-A, after only top portion 404 of a head is obtained, a center section 802 of leaves is removed from top portion 404. After center section 802 has been removed, as depicted in FIG. 8-B, a cup-shaped portion 804 of the top portion remains. FIG. 9 depicts two cup-shaped portions 804 of two top portions with the center sections removed from the two top portions. FIGS. 8-B and 9 depict the appearance of cup-shaped portions 804 of heads with about half of the bottom portions of the heads having been cut away. It should be recognized, however, that the particular shape of cup-shaped portions 804 can vary depending on the amount of the bottom portions of the heads that has been cut away.

With reference now to FIGS. 10-A and 10-B, in one exemplary embodiment, the top portion of a head is processed using a cleaning tab 1004. In the present exemplary embodiment, cleaning tab 1004 is depicted as being disposed on a harvesting knife 1002. In particular, as depicted in FIGS. 10-A and 10-B, cleaning tab 1004 is disposed at the heel of the blade near the handle of harvesting knife 1002, and extends from the cutting edge of the blade. It should be recognized, however, that cleaning tab 1004 can be attached to various other types of harvesting tools or attached on its own to a handle.

In one exemplary embodiment, harvesting knife 1002 is about seven inches in length, and cleaning tab 1004 is about three inches long and about one inch in width. It should be recognized, however, that the specific dimensions and shapes of harvesting knife 1002 and cleaning tab 1004 can vary. Additionally, cleaning tab 1004 can be attached to the blade, such as by being welded on, or the blade and cleaning tab 1004 can be formed as a unitary piece.

As depicted in FIG. 11-A, the cutting edge of the blade of harvesting knife 1002 (FIG. 10-A) is used to harvest a head. Harvesting knife 1002 (FIG. 10-A) can be used to harvest the head by cutting the stem of the head and then cutting away the bottom portion of the head. Alternatively, harvesting knife 1002 (FIG. 10-A) can be used to harvest the heady by cutting the head to leave the bottom portion of the head in the ground.

As depicted in FIG. 11-B, after obtaining the top portion of a harvest head, the cleaning tab is used to remove the center section from the top portion. In particular, as depicted in FIG. 12, cleaning tab 1004 is inserted into center section 802, and then center section 802 is pried out. Thus, in this manner, center section 802 can be removed without the cutter having to touch center section 802 with his/her hands. Additionally, the cutter does not need to put harvesting knife 1002 down to pick up another tool to remove center section 802. Indeed, the cutter need not change his/her grip on the handle between cutting the head with the cutting edge of the blade and removing center section 802 with cleaning tab 1004.

As depicted in FIG. 11-C, after the center section has been removed, the cut surfaces are sprayed with a rinsing solution, such as chlorinated rinse water solution, to prevent discoloration. It should be recognized, however, that various rinsing solutions may be used. Additionally, the step of spraying the cut surfaces may be omitted.

With reference now to FIG. 11-D, cup-shaped portions 804 are packed in a carton 1302. In one exemplary embodiment, two or more cup-shaped portions 804 are stacked together into carton 1302. In particular, as depicted in FIG. 13, a cup-shaped portion 804 has a concave portion 1304 and a convex portion 1306. The concave portions 1304 stack on the convex portions 1306. Thus, as depicted in FIG. 13, the cup shape of cup-shaped portions 804 has the advantage of providing for tighter packing of cup-shaped portions 804 than a whole head. In one exemplary embodiment, four cup-shaped portions 804 are stacked together in a single stack. Thus, four layers of cup-shaped portions 804 are stacked together with eight cup-shaped portions in each layer. Thus, a total of 32 cup-shaped portions 804 are packed in each carton 1302.

With reference to FIG. 14, exemplary dimensions of carton 1302 are depicted. In particular FIG. 14 depicts carton 1302 in its unassembled form. Carton 1302 has an overall width of 71.08 inches. Carton 1302 includes a first long side wall 1402, a first short side wall 1404, a second long side wall 1406 and a second short side wall 1408 that are 23.06 inches, 11.09 inches, 23.07 inches, and 11.06 inches in width, respectively. As depicted in FIG. 14, first long side wall 1402 includes a tab edge 1410 that is 1.10 inches wide, which is used to attach first long side wall 1402 to second short side wall 1408 when carton 1302 is assembled. As also depicted in 14, carton 1302 has an overall height of 21.03 inches. Carton 1402 includes top flaps 1412 and bottom flaps 1414 that are 5.13 inches and 5.13 inches in height. As depicted in FIG. 14, side walls 1402, 1404, 1406, and 1408 are 9.09 inches in height. It should be recognized that these dimensions are exemplary.

With reference to FIG. 15, in one exemplary embodiment, carton 1302 is lined with a plastic film 1502. Thus, after the cup-shaped portions 804 have been packed into carton 1302, plastic film 1502 is folded over the cup-shaped portions 804. Carton 1302 is then closed and taped or stapled. It should be recognized that plastic film 1502 can be omitted in some circumstances. Additionally, carton 1302 can be closed and sealed in any number of manners.

With reference to FIG. 16, 54 cartons 1302 are stacked onto a single pallet 1602 with nine layers of six cartons 1302 in each layer. Each carton 1302 typically weighs about 22 pounds. Thus, each pallet 1602 typically holds 1728 cup-shaped portions weighing a total of about 1188 pounds. Cartons 1302 on pallet 1602 are then vacuum cooled then shipped to destination markets, where they are ultimately shipped to end users.

Note that a pallet of cartons 1302 holds a total of 1728 cup-shaped portions. In comparison, a pallet of cartons 302 (FIG. 3) holds a total of 960 whole heads. Thus, a pallet of cartons 1302 reduces freight and handling costs by almost 45 percent over a pallet of cartons 302 (FIG. 3).

Additionally, waste disposal costs by end users are reduced because what would have been waste (the core, stem and leaves) are left in the field. Carton disposal costs are reduced because of the reduction in the number of cartons needed to ship a desired quantity of cup-shaped portions. The increase in number of products per carton (32 cup-shaped portions vs. 24 whole heads per carton) produces a reduction in hauling and handling costs. The reduction in weight per carton also allows for additional cartons per pallet with less gross weight per pallet and more usable net weight per pallet. There is also a reduction in storage space needed by an end user due to increased number of usable products per carton and reduction of cube and weight per carton. There is also a reduction in labor costs by end users because of reduction in coring and trimming needed at the destination.

In one exemplary use of the present cup-shaped portions, one or more boxes 1302 of cup-shaped portions are shipped to a restaurant. Cup-shaped portions are used to serve "lettuce wraps" in Chinese cuisine. In particular, as depicted in FIG. 17, individual leaves are peeled from a cup-shaped portion and filled with a filling.

The foregoing descriptions of specific embodiments have been presented for purposes of illustration and description. They are not intended to be exhaustive, and it should be understood that many modifications and variations are possible in light of the above teaching.

We claim:

1. A method of commercially harvesting lettuce in a field, the lettuce having a head, a stem, and roots extending from the stem when the lettuce is growing in the field, wherein the head has a core with inner leaves extending from the core, wherein the head has a top portion and a bottom portion, wherein the bottom portion is attached to the stem when the lettuce is growing in the field, and wherein the bottom portion includes all of the core, the method comprising:
    a) removing the bottom portion of the head of lettuce to obtain only the top portion of the head; and
    b) after performing step a), removing a center section of the top portion of the head to leave a cup-shaped portion of the head, wherein steps a) and b) are performed in the field in which the head was harvested.

2. The method of claim 1, wherein step a) comprises:
    cutting the stem to harvest the head from the ground;
    after cutting the stem, cutting away the top portion of the head from the bottom portion of the head to obtain only the top portion of the head.

3. The method of claim 1, wherein step a) comprises:
    while the lettuce is in the ground, cutting away the top portion of the head from the bottom portion of the head to leave the bottom portion attached to the stem in the ground to obtain only the top portion of the head.

4. The method of claim 1, wherein the head of lettuce has a mid-line defined by the widest portion of the head with the stem oriented downward.

5. The method of claim 4, wherein the head is cut below the mid-line to obtain the top portion of the head in step a).

6. The method of claim 1, wherein the top portion of the head obtained in step a) is about 30 to 40 percent by weight of the head.

7. The method of claim 1, wherein the top portion includes only portions of inner leaves.

8. The method of claim 1, wherein step b) is performing using a cleaning tab.

9. The method of claim 8, wherein the cleaning tab is disposed on a harvesting knife having a blade with a cutting edge and a heel, wherein the cleaning tab is disposed on the heel and extends from the cutting edge of the blade.

10. The method of claim 9, wherein the cleaning tab extends generally at a right angle from the cutting edge of the blade.

11. The method of claim 9, wherein step a) is performed using the cutting edge of the blade, and wherein steps a) and b) are performed using the harvesting knife without changing a user's grip on the handle of the harvesting knife.

12. The method of claim 1, further comprising:
after b), rinsing cut sites on the cup-shaped portion using a rinsing solution.

13. The method of claim 1, further comprising:
packing a plurality of cup-shaped portions into a carton, wherein the cup-shaped portions have a concave portion and a convex portion, wherein the plurality of cup-shaped portions are packed in a plurality of stacks in the carton, and wherein each stack comprises two or more cup-shaped portions stacked with concave portions stacked on top of convex portions.

14. The method of claim 13, wherein the carton includes eight stacks of cup-shaped portions arranged in two rows, and wherein each stack includes four cup-shaped portions.

15. The method of claim 13, further comprising:
stacking a plurality of cartons on a pallet;
vacuum cooling the cartons on the pallet; and
shipping the pallet with the stacks of cartons to destination markets.

16. The method of claim 15, wherein the pallet includes nine layers of cartons with six cartons in each layer.

17. The method of claim 1, wherein the lettuce is iceberg lettuce.

18. A method of commercially harvesting lettuce, the lettuce having a head, a core, a stem, and roots, wherein the stem connects the head to the roots when the lettuce is growing in the ground, wherein the head has a top portion and a bottom portion, wherein the bottom portion is connected to the stem, and wherein the bottom portion includes all of the core, the method comprising:
a) while the lettuce is in the ground, cutting away the bottom portion of the head to leave the bottom portion attached to the stem in the ground;
b) retaining the top portion of the head; and
c) removing a center section from the top portion of the head to leave a cup-shaped portion of the head, wherein steps a)-c) are performed in the field.

19. The method of claim 18, wherein the head before having the bottom portion cut away in step a) has a mid-line defined by the widest portion of the head with the stem oriented downward.

20. The method of claim 19, wherein the head is cut below the mid-line to cut away the bottom portion in step a).

21. The method of claim 19, wherein the top portion retained in step b) is about 30 to 40 percent by weight of the head.

22. The method of claim 18, wherein the top portion includes only portions of inner leaves.

23. The method of claim 18, wherein steps a) and c) are performed using a harvesting knife having a blade with a cutting edge and a heel, a handle, and a cleaning tab disposed on the heel and extending from the cutting edge of the blade, wherein step a) is performed using the cutting edge of the blade, and wherein step c) is performed using the cleaning tab.

24. The method of claim 23, wherein steps a) and c) are performing using the harvesting knife without changing a user's grip on the handle of the harvesting knife.

25. The method of claim 18, further comprising:
after c), rinsing cut sites on the cup-shaped portion using a rinsing solution.

26. The method of claim 18, further comprising:
packing a plurality of cup-shaped portions into a carton, wherein the cup-shaped portions have a concave portion and a convex portion, wherein the plurality of cup-shaped portions are packed into a plurality of stacks in the carton, and wherein each stack comprises two or more cup-shaped portions stacked with concave portions stacked on top of convex portions.

27. A method of commercially harvesting lettuce in a field, the lettuce having a head, a stem, and roots extending from the stem when the lettuce is growing in the field, wherein the head has a core with inner leaves extending from the core, wherein the head has a top portion and a bottom portion, wherein the head of lettuce has a mid-line defined by the widest portion of the head with the stem oriented downward, wherein the bottom portion is attached to the stem when the lettuce is growing in the field, and wherein the bottom portion includes all of the core, the method comprising:
a) cutting the head below the mid-line to remove the bottom portion of the head of lettuce to obtain only the top portion of the head; and
b) after performing step a), removing a center section of the top portion of the head to leave a cup-shaped portion of the head, wherein steps a) and b) are performed in the field in which the head was harvested.

28. The method of claim 27, further comprises:
before a), cutting the stem to harvest the head from the ground.

29. The method of claim 27, wherein, in step a), the head is cut below the mid-line while the lettuce is in the ground to leave the bottom portion attached to the stem in the ground.

30. The method of claim 27, wherein the top portion of the head obtained in step a) is about 30 to 40 percent by weight of the head.

31. The method of claim 27, wherein the top portion includes only portions of inner leaves.

32. The method of claim 27, further comprising:
after b), packing a plurality of cup-shaped portions into a carton, wherein the cup-shaped portions have a concave portion and a convex portion, wherein the plurality of cup-shaped portions are packed in a plurality of stacks in the carton, and wherein each stack comprises two or more cup-shaped portions stacked with concave portions stacked on top of convex portions.

33. The method of claim 32, further comprising:
stacking a plurality of cartons on a pallet;
vacuum cooling the cartons on the pallet; and
shipping the pallet with the stacks of cartons to destination markets.

34. The method of claim 33, wherein the carton includes eight stacks of cup-shaped portions arranged in two rows, and wherein each stack includes four cup-shaped portions, and wherein the pallet includes nine layers of cartons with six cartons in each layer.

35. The method of claim 27, wherein the lettuce is iceberg lettuce.

* * * * *